(12) United States Patent
Brown et al.

(10) Patent No.: US 9,611,773 B2
(45) Date of Patent: Apr. 4, 2017

(54) ZONED CATALYSED SUBSTRATE MONOLITH

(71) Applicant: Johnson Matthey Public Limited Company, London (GB)

(72) Inventors: Gavin Michael Brown, Saffron Walden (GB); Andrew Francis Chiffey, Ware (GB); Paul Richard Phillips, Royston (GB); Daniel Swallow, Sandy (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/131,817

(22) PCT Filed: Nov. 22, 2013

(86) PCT No.: PCT/GB2013/053094
§ 371 (c)(1),
(2) Date: Jan. 9, 2014

(87) PCT Pub. No.: WO2014/080220
PCT Pub. Date: May 30, 2014

(65) Prior Publication Data
US 2015/0252708 A1   Sep. 10, 2015

(30) Foreign Application Priority Data

Nov. 22, 2012   (GB) .................................. 1221025.8

(51) Int. Cl.
*B01D 47/00*   (2006.01)
*B01D 53/34*   (2006.01)
(Continued)

(52) U.S. Cl.
CPC ............... *F01N 3/20* (2013.01); *B01D 53/52* (2013.01); *B01D 53/9422* (2013.01);
(Continued)

(58) Field of Classification Search
CPC ........ B01J 21/04; B01J 21/063; B01J 21/066; B01J 21/08; B01J 21/12; B01J 23/10;
(Continued)

(56) References Cited

U.S. PATENT DOCUMENTS 5,196,390 A   3/1993   Tauster et al.
5,473,887 A   12/1995   Takeshima et al.
(Continued)

FOREIGN PATENT DOCUMENTS

DE   102009033365 A1   1/2011
EP   1897615 A2   3/2008
(Continued)

OTHER PUBLICATIONS

Elwart, et al., "H2S Suppression During the Desulfation of a Lean NOx Trap with a Nickel-Containing Catalyst," SAE Technical Paper Series, 2005-01-1116; 2005 SAE World Congress; Apr. 11-14, 2005.
(Continued)

*Primary Examiner* — Cam N. Nguyen
(74) *Attorney, Agent, or Firm* — Gary D. Mangels

(57) ABSTRACT

A zoned catalyzed substrate monolith comprises a first zone and a second zone that are arranged axially in series. The first zone comprises a platinum group metal loaded on a support and a first base metal oxide or a first base metal loaded on an inorganic oxide. The first base metal oxide is iron oxide, manganese oxide, copper oxide, zinc oxide, nickel oxide, or mixtures thereof. The first base metal is iron, manganese, copper, zinc, nickel, or mixtures thereof. The second zone comprises copper or iron loaded on a zeolite and a second base metal oxide or a second base metal loaded on an inorganic oxide. The second base metal oxide is iron oxide, manganese oxide, copper oxide, zinc oxide, nickel oxide, or mixtures thereof. The second base metal is iron,
(Continued)

manganese, copper, zinc, nickel, or mixtures thereof. The second base metal is different from the first base metal.

22 Claims, 1 Drawing Sheet

(51) Int. Cl.
| | |
|---|---|
| B01D 53/56 | (2006.01) |
| B01D 53/94 | (2006.01) |
| B01J 8/00 | (2006.01) |
| B01D 50/00 | (2006.01) |
| F01N 3/10 | (2006.01) |
| B01J 21/00 | (2006.01) |
| B01J 21/04 | (2006.01) |
| B01J 29/00 | (2006.01) |
| B01J 29/06 | (2006.01) |
| B01J 23/00 | (2006.01) |
| B01J 23/02 | (2006.01) |
| B01J 23/10 | (2006.01) |
| B01J 23/32 | (2006.01) |
| B01J 23/42 | (2006.01) |
| B01J 23/44 | (2006.01) |
| B01J 23/56 | (2006.01) |
| B01J 23/60 | (2006.01) |
| B01J 23/70 | (2006.01) |
| B01J 23/72 | (2006.01) |
| B01J 23/74 | (2006.01) |
| F01N 3/20 | (2006.01) |
| B01J 37/02 | (2006.01) |
| B01J 35/00 | (2006.01) |
| B01J 23/656 | (2006.01) |
| B01J 23/89 | (2006.01) |
| B01J 29/072 | (2006.01) |
| B01J 29/74 | (2006.01) |
| B01J 29/76 | (2006.01) |
| B01J 29/78 | (2006.01) |
| F01N 3/08 | (2006.01) |
| F01N 3/021 | (2006.01) |
| F01N 13/00 | (2010.01) |
| B01J 23/63 | (2006.01) |
| B01D 53/52 | (2006.01) |
| B01J 35/04 | (2006.01) |
| B01J 29/70 | (2006.01) |
| F01N 3/28 | (2006.01) |
| B01J 35/02 | (2006.01) |
| B01J 37/00 | (2006.01) |
| B01J 23/648 | (2006.01) |
| B01J 23/652 | (2006.01) |

(52) U.S. Cl.
CPC ..... *B01D 53/9445* (2013.01); *B01D 53/9459* (2013.01); *B01D 53/9477* (2013.01); *B01J 23/002* (2013.01); *B01J 23/60* (2013.01); *B01J 23/63* (2013.01); *B01J 23/6562* (2013.01); *B01J 23/892* (2013.01); *B01J 23/894* (2013.01); *B01J 23/8906* (2013.01); *B01J 23/8926* (2013.01); *B01J 23/8986* (2013.01); *B01J 29/072* (2013.01); *B01J 29/7007* (2013.01); *B01J 29/7415* (2013.01); *B01J 29/7615* (2013.01); *B01J 29/7815* (2013.01); *B01J 35/0006* (2013.01); *B01J 35/04* (2013.01); *B01J 37/0221* (2013.01); *B01J 37/0228* (2013.01); *B01J 37/0236* (2013.01); *B01J 37/0246* (2013.01); *B01J 37/0248* (2013.01); *F01N 3/021* (2013.01); *F01N 3/085* (2013.01); *F01N 3/0821* (2013.01); *F01N 3/0842* (2013.01); *F01N 3/0885* (2013.01); *F01N 3/10* (2013.01); *F01N 3/2839* (2013.01); *F01N 13/009* (2014.06); *B01D 2255/102* (2013.01); *B01D 2255/2065* (2013.01); *B01D 2255/2073* (2013.01); *B01D 2255/20707* (2013.01); *B01D 2255/20715* (2013.01); *B01D 2255/20738* (2013.01); *B01D 2255/20753* (2013.01); *B01D 2255/20761* (2013.01); *B01D 2255/20769* (2013.01); *B01D 2255/20776* (2013.01); *B01D 2255/20792* (2013.01); *B01D 2255/30* (2013.01); *B01D 2255/502* (2013.01); *B01D 2255/9032* (2013.01); *B01D 2255/9155* (2013.01); *B01D 2257/304* (2013.01); *B01D 2258/012* (2013.01); *B01J 23/648* (2013.01); *B01J 23/652* (2013.01); *B01J 23/898* (2013.01); *B01J 23/8953* (2013.01); *B01J 23/8993* (2013.01); *B01J 35/023* (2013.01); *B01J 37/0036* (2013.01); *B01J 37/0234* (2013.01); *B01J 2229/186* (2013.01); *B01J 2523/00* (2013.01); *F01N 2510/063* (2013.01); *F01N 2510/0682* (2013.01); *Y02T 10/22* (2013.01)

(58) Field of Classification Search
CPC ... B01J 23/34; B01J 23/40; B01J 23/42; B01J 23/44; B01J 23/46; B01J 23/60; B01J 23/63; B01J 23/6562; B01J 23/70; B01J 23/72; B01J 23/74; B01J 23/745; B01J 23/755; B01J 23/80; B01J 23/83; B01J 23/8892; B01J 23/8906; B01J 23/892; B01J 23/8926; B01J 23/8933; B01J 23/894; B01J 23/8953; B01J 23/8986; B01J 29/00; B01D 53/944; F01N 3/2885
USPC ....... 502/64, 66, 73, 74, 258, 259, 261–263, 502/304, 324, 326, 327, 329, 331–339, 502/345, 346, 349–351, 355, 439, 527.12; 422/171; 60/299; 423/212
See application file for complete search history.

(56) References Cited

U.S. PATENT DOCUMENTS

| | | | | |
|---|---|---|---|---|
| 5,863,508 | A | 1/1999 | Lachman et al. | |
| 6,087,298 | A | 7/2000 | Sung et al. | |
| 6,239,064 | B1 * | 5/2001 | Nguyen | B01D 53/8662 502/304 |
| 7,481,983 | B2 * | 1/2009 | Patchett | B01D 53/9418 422/177 |
| 7,601,662 | B2 * | 10/2009 | Bull | B01J 35/0006 423/700 |
| 7,767,176 | B2 * | 8/2010 | Patchett | B01D 53/9418 423/213.5 |
| 7,837,953 | B2 * | 11/2010 | Shore | B01J 19/2485 422/211 |
| 8,226,896 | B2 | 7/2012 | Pfeifer et al. | |
| 8,293,182 | B2 * | 10/2012 | Boorse | B01D 53/9468 422/180 |
| 8,540,952 | B2 * | 9/2013 | Swallow | B01D 53/9418 423/213.2 |
| 8,667,785 | B2 * | 3/2014 | Blakeman | B01J 35/0006 423/213.5 |
| 8,709,365 | B2 | 4/2014 | Dornhaus et al. | |
| 8,735,311 | B2 * | 5/2014 | Bull | B01D 53/9418 423/700 |
| 8,756,926 | B2 * | 6/2014 | Chandler | F01N 3/0222 423/239.1 |

(56) References Cited

U.S. PATENT DOCUMENTS

| | | | |
|---|---|---|---|
| 8,795,617 B2* | 8/2014 | Swallow | B01D 53/9418 423/213.2 |
| 9,034,286 B2* | 5/2015 | Bergeal | B01D 53/945 422/180 |
| 9,321,009 B2 | 4/2016 | Wan et al. | |
| 2004/0001781 A1 | 1/2004 | Kumar et al. | |
| 2005/0160720 A1 | 7/2005 | Elwart et al. | |
| 2009/0217652 A1 | 9/2009 | Bergeal et al. | |
| 2011/0138777 A1 | 6/2011 | Jen et al. | |
| 2011/0182791 A1* | 7/2011 | Fedeyko | B01D 53/9436 423/237 |
| 2011/0263417 A1* | 10/2011 | Collier | B01D 53/9418 502/304 |
| 2015/0224478 A1* | 8/2015 | Bergeal | B01D 53/945 423/213.5 |
| 2015/0238934 A1* | 8/2015 | Blakeman | B01J 35/0006 422/171 |
| 2016/0101413 A1* | 4/2016 | Fedeyko | B01D 53/9436 422/171 |

FOREIGN PATENT DOCUMENTS

| | | |
|---|---|---|
| EP | 2692430 A1 | 2/2014 |
| GB | 2476573 A | 6/2011 |
| GB | 2492175 A | 12/2012 |
| JP | 62-68543 | 3/1987 |
| JP | 62-68544 | 3/1987 |
| JP | 2001070754 A | 3/2001 |
| WO | 2008075111 A1 | 6/2008 |
| WO | 2008088649 A1 | 7/2008 |
| WO | 2010114873 A2 | 1/2011 |
| WO | 2012175948 A1 | 10/2012 |
| WO | 2012132095 A1 | 12/2012 |

OTHER PUBLICATIONS

Stang, et al., "Cummins Light Truck Diesel Engine Progress Report," SAE Technical Paper Series, 2001-01-2065; Government/Industry Meeting; May 14-16, 2001.

* cited by examiner

ZONED CATALYSED SUBSTRATE MONOLITH

CROSS-REFERENCE TO RELATED APPLICATIONS

This application is the U.S. National Phase application of PCT International Application No. PCT/GB2013/053094, filed Nov. 22, 2013, and claims priority benefit of U.S. Provisional Patent Application No. 61/757,304, filed Jan. 28, 2013 and Great Britain Patent Application No. 1221025.8, filed Nov. 22, 2012, the disclosures of all of which are incorporated herein by reference in their entireties for all purposes.

FIELD OF THE INVENTION

The present invention relates to a zoned catalysed substrate monolith for controlling hydrogen sulphide gas formed in a lean NOx trap during desulphation of the lean NOx trap over an extended temperature range as compared to known hydrogen sulphide control mechanisms. The invention also relates to an exhaust system for an internal combustion engine comprising a lean NOx trap and the zoned catalysed substrate monolith and to various methods of making the zoned catalysed substrate monolith and of treating an exhaust gas from an internal combustion engine.

BACKGROUND OF THE INVENTION

Vehicular emissions which are the principle pollutants that have negative effects on public health and the natural environment are generally recognised to be carbon monoxide (CO), hydrocarbons (HC), nitrogen oxides ($NO_x$) and particulate matter.

Several solutions have been proposed to remove and/or control these principle pollutants, some of which focus on the engine design and some of which focus on control of emissions from exhaust systems.

Typical exhaust systems that exist to remove and/or control such emissions comprise a NOx Trap, an oxidation catalyst to catalyse conversion of CO and HC, which are present as a result of incomplete combustion of the fuel in the engine, and a filter substrate to remove particulate matter.

Lean NOx traps (LNT) (also known as NOx adsorber catalyst); such as disclosed in U.S. Pat. No. 5,473,887, use a trap, for example an alkaline earth metal oxide that adsorbs NOx during the lean mode of operation. Exhaust gas is typically rich in NO which is converted to $NO_2$ over a platinum group metal-containing oxidising catalyst, such as platinum or ruthenium, and the $NO_2$ is trapped and stored on the alkaline earth metal oxide, such as barium carbonate, which is incorporated within the platinum group containing catalyst. The NOx is then released from the barium under rich conditions, when the oxygen concentration in the exhaust emission is decreased, and reduced with a suitable reductant, for example diesel fuel for diesel engines, using a rhodium catalyst as a promoter. The rhodium catalyst may be incorporated on the platinum group containing catalyst or it may be located downstream of the LNT.

One mechanism commonly given for NOx trapping from a lean exhaust gas for this formulation is:

$$NO + 0.5O_2 \rightarrow NO_2 \quad (1);$$

$$BaO + NO_2 + 0.5O_2 \rightarrow Ba(NO_3)_2 \quad (2),$$

wherein in reaction (1), the NO reacts with oxygen on active oxidation sites on the platinum group metal catalyst to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + 1.5O_2 \text{ or } Ba(NO_3)_2 \rightarrow BaO + 2NO_2 + 0.5O_2 \quad (3);$$

and $$NO + CO \rightarrow 0.5N_2 + CO_2 \text{ (and other reactions)} \quad (4).$$

In the reactions of (1)-(4) above, the reactive barium species is given as the oxide.

However, it is understood that in the presence of air or lean engine exhaust gas most of the barium is in the form of the carbonate or possibly the hydroxide. The skilled person can adapt the above reaction schemes accordingly for species of barium other than the oxide.

A problem in the use of LNT, e.g. in both diesel and gasoline applications, is that the engine fuel also contains sulphur, and this is converted to sulphur dioxide ($SO_2$) during fuel combustion. $SO_2$ is oxidised to sulphur trioxide ($SO_3$) by the oxidation catalyst component of the LNT and the $SO_3$ is adsorbed on the NOx adsorber by a similar mechanism to that of $NO_2$. There are a finite number of active sites on the NOx trapping component for adsorbing the NOx and so the presence of sulphate on the NOx trapping component reduces the capacity of the NOx trapping component as a whole to adsorb NOx. Therefore, in order to retain sufficient NOx trapping capability, sulphur must be periodically removed from the LNT. However, sulphates of NOx trapping components such as barium are more stable than nitrates in lean exhaust gas and generally higher temperatures and/or richer conditions for longer periods are required to remove SOx than for desorbing NOx.

Desulphation can be accomplished by a variety of techniques including by a series of short, rich pulses. A significant problem with desulphating a LNT using richer than normal exhaust gas compositions is that the sulphate is removed as hydrogen sulphide. This compound has a characteristic and unpleasant rotten egg odour, 0.0047 ppm is the recognition threshold, the concentration at which 50% of humans can detect the characteristic odour of hydrogen sulphide, and accordingly it is desirable to prevent/limit its emission to atmosphere.

This problem has been reduced to a certain extent in recent years for diesel fuels because Ultra Low Sulphur Diesel (fuel of maximum sulphur content of 15 ppm (wt.)) is now available in the US. In Europe, diesel fuel with a maximum sulphur limit of 10 ppm has been available since the beginning of 2010. As a result, LNT desulphation procedures are required less often. However the extremely low odour threshold of hydrogen sulphide means that even a small emission to atmosphere is undesirable.

Particulate filters have been shown to be extremely effective at removal of particulate matter over the entire particle size range. However, these filters have limited capacity for trapping particulate matter before the pressure drop becomes excessive. Therefore it is necessary to periodically regenerate the particulate filter. Passive regeneration may not readily take place as combustion of the retained particulate matter in the presence of oxygen requires higher temperatures than those typically provided by engine exhausts, particularly in the case of diesel passenger car exhausts. One effective method to lower the combustion temperature of the trapped particulate matter on the particulate filter is the addition of a catalysed washcoat to the filter substrate. Compositions of catalysed washcoats used are similar to those used in oxidation catalysts and typically comprise at least one platinum group metal supported on a suitable support material. Suitable support materials include alumina, silica-alumina, ceria or a mixed oxide or composite oxide of ceria and zirconia, and mixtures thereof. Such filters are typically known as catalysed soot filters (CSF).

A diesel exhaust system comprising a LNT and a downstream CSF is known. For example SAE 2001-01-2065 entitled "Cummins Light Truck Diesel Engine Progress Report" discloses such a system. It is acknowledged by the authors in this report that there was no consideration of the effects of deterioration or contamination due to sulphur poisoning and no attempt was made to desulphate during any of the driving cycles.

WO2008/075111 discloses an apparatus comprising a lean burn internal combustion engine which comprises an exhaust system for treating a flowing exhaust gas from the engine having a LNT, a CSF, a means for enriching the exhaust gas to provide an enriched exhaust gas intermittently during operation in order to remove sulphate that is adsorbed on the LNT and a compound located downstream of at least some of the LNT which is effective in removing and/or converting hydrogen sulphide that is produced during the sulphate removal process. The hydrogen sulphide removal and/or converting material is selected from the group consisting of oxides of nickel, calcium, iron and barium. The hydrogen sulphide removal and/or converting material may be located in a variety of positions in the exhaust system, which include between the LNT and CSF, on the CSF, between the CSF and the exhaust system exit. The only discussion about why the hydrogen sulphide removal and/or converting material is placed at the chosen position is with respect to any platinum group metal oxidation catalysts as nickel oxide can poison the hydrocarbon and carbon monoxide activity of the platinum group metal catalyst.

U.S. Pat. No. 5,196,390 discloses a method of suppressing hydrogen sulphide formation by a three way catalyst by incorporating one or more of oxides of nickel, iron and manganese into an undercoat layer disposed on a monolith substrate. A topcoat overlying the undercoat comprises standard three way catalyst material. This structure avoids any interaction between the three way catalyst and the hydrogen sulphide suppressing material.

Applicant's PCT application no. PCT/GB2012/051407 filed 19 Jun. 2012 discloses an exhaust system for internal combustion engines and a catalysed substrate for use in an exhaust system. The exhaust system comprises a lean NOx trap and the catalysed substrate. The catalysed substrate has a first zone and a second zone, wherein the first zone comprises a platinum group metal loaded on a support and the second zone comprises copper or iron loaded on a zeolite. The first zone or second zone additionally comprises a base metal oxide or a base metal loaded on an inorganic oxide. Also provided are methods for treating an exhaust gas from an internal combustion engine using the exhaust system. The exhaust system is capable of storing $NH_3$ generated in a rich purge, reacting the $NH_3$ with slip NOx from the NOx trap, controlling $H_2S$ released from NOx trap desulphation, and oxidizing slip hydrocarbons and carbon monoxide. When the catalysed substrate is a filter substrate, it is also capable of removing soot from exhaust system.

The different materials that are available to remove and/or convert the hydrogen sulphide each operate most efficiently over a defined temperature range. For example oxides of iron are known to be effective at lower temperatures, typically 400-800° C., and oxides of manganese are known to be effective at higher temperatures, which in some cases can be in excess of 1000° C. Mixing together some of these different materials may not be enough to extend the temperature range for removal and/or conversion of the hydrogen sulphide as there may be negative interactions based on such combinations.

We have now identified a system which is capable of treating both NOx and particulate matter emitted from the exhaust system of an internal combustion engine whilst also removing and/or converting unwanted hydrogen sulphide emissions over a broad temperature range. This is achieved by providing a catalysed substrate monolith downstream of an LNT, whose desuiphation process leads to the formation of undesirable hydrogen sulphide, wherein separate zones within the catalysed substrate comprise different materials for removal and/or conversion of hydrogen sulphide emissions. Particulate matter can be trapped on a separate filter substrate or more preferably the catalysed substrate monolith is a catalytic soot fitter.

Accordingly, in a first aspect, the invention provides a zoned catalysed substrate monolith comprising a first zone and a second zone, wherein the first zone and the second zone are arranged axially in series, wherein the first zone comprises a first base metal oxide or a first base metal loaded on an inorganic oxide and the second zone comprises a second base metal oxide or a second base metal loaded on an inorganic oxide wherein the second base metal is different from the first base metal.

In a preferred embodiment, neither the first zone nor the second zone nor (where present) the third zone contains copper or iron loaded on a zeolite.

According to a second aspect, the invention provides an exhaust system for an internal combustion engine comprising:
 (a) a lean NO trap; and
 (b) a zoned catalysed substrate monolith according to any preceding claim, wherein the first zone is oriented to the upstream side,
wherein the zoned catalysed substrate monolith is disposed downstream from the lean $NO_x$ trap.

The lean NOx trap typically includes a NOx adsorbent for the storage/trapping of NOx and an oxidation/reduction catalyst. The oxidation/reduction catalyst generally comprises one or more noble metals, preferably platinum, palladium, and/or rhodium. Typically, platinum is included to perform the oxidation function and rhodium is included to perform the reduction function. The rhodium catalyst may be positioned downstream of the LNT.

SUMMARY OF THE INVENTION

The invention is a zoned catalysed substrate monolith that comprises a first zone and a second zone that are arranged axially in series. The first zone comprises a platinum group metal loaded on a support and a first base metal oxide selected from the group consisting of iron oxide, manganese oxide, copper oxide, zinc oxide, nickel oxide, and mixtures thereof or a first base metal selected from the group consisting of iron, manganese, copper, zinc, nickel, and mixtures thereof loaded on an inorganic oxide. The second zone comprises copper or iron loaded on a zeolite and a second base metal oxide selected from the group consisting of iron oxide, manganese oxide, copper oxide, zinc oxide, nickel oxide, and mixtures thereof or a second base metal selected from the group consisting of iron, manganese, copper, zinc, nickel, and mixtures thereof loaded on an inorganic oxide. The second base metal is different from the first base metal. The invention also includes an exhaust system for an internal combustion engine comprising a lean $NO_x$ trap and the zoned catalysed substrate monolith, a method of treating an exhaust gas from an internal combustion engine using the exhaust system, as well a method of making the zoned catalysed substrate monolith.

DETAILED DESCRIPTION OF THE INVENTION

Figure 1:
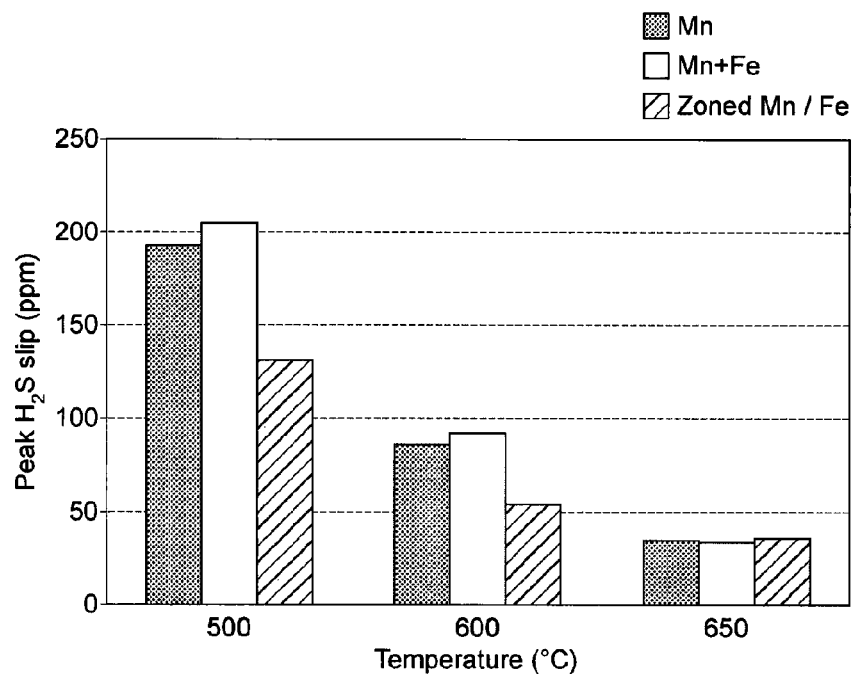
FIG. 1 is a histogram showing the hydrogen sulphide slip for a simulated rich exhaust gas passed through a catalysed substrate of the invention and a comparative catalysed substrate.
Figure 2:
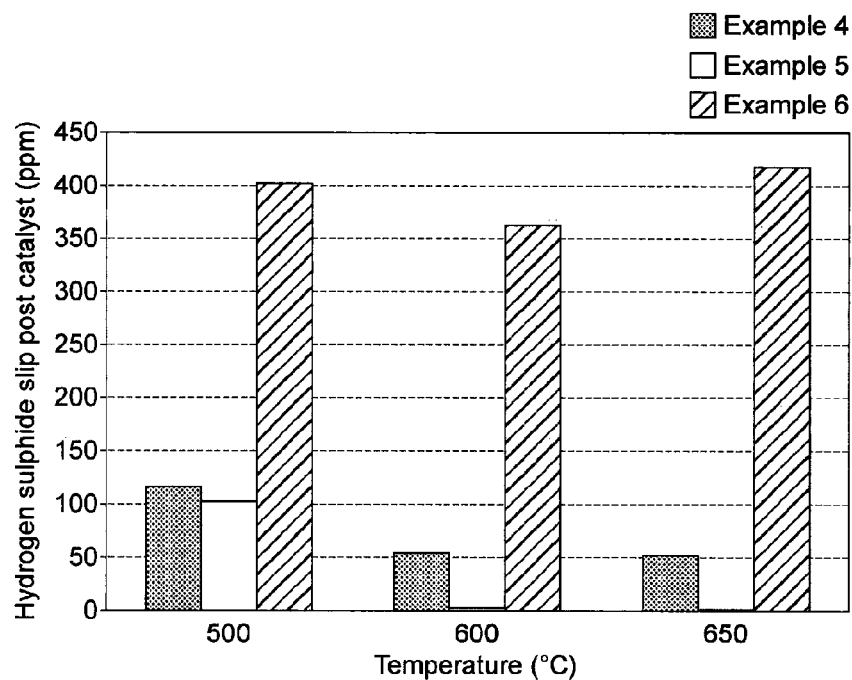
FIG. 2 is a histogram showing the hydrogen sulphide slip for a simulated rich exhaust gas passed through a filter substrate catalysed with a catalyst corresponding to the first zone according to the present invention.

The NOx adsorbent preferably comprises at least one alkaline earth metals (such as barium, calcium, strontium, and magnesium), at least one alkali metals (such as potassium, sodium, lithium, and caesium) or at least one rare earth metals (such as lanthanum, yttrium, praseodymium and neodymium), or combinations thereof. These metals are typically found in the form of oxides. Most preferably the NOx adsorbent comprises alkaline earth metals in the form of oxides. It is to be noted that although the alkaline earth metal species is disclosed as the oxide it is understood that in the presence of air or lean engine exhaust gas most of the alkaline earth metal species, for example barium, is in the form of the carbonate or possibly the hydroxide.

The oxidation/reduction catalyst and the NOx adsorbent are preferably loaded on a support material such as an inorganic oxide for use in the exhaust system. Inorganic oxides such as alumina, silica-alumina, ceria, titania, zirconia, alumina-zirconia, and combinations thereof are preferably utilised as the support material.

The lean NOx trap performs three functions. First, NO from the exhaust gas reacts with oxygen to produce $NO_2$ in the presence of the oxidation catalyst. Second, the $NO_2$ is adsorbed by the NOx adsorbent in the form of an inorganic nitrate (for example, BaO or $BaCO_3$ is converted to $Ba(NO_3)_2$ on the NOx adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons in the presence of the reduction catalyst. Typically, the nitrogen oxides are converted to nitrogen, carbon dioxide and water in the presence of heat, carbon monoxide and hydrocarbons in the exhaust stream.

In a NOx trap, the NOx adsorbent and the oxidation/reduction catalyst are preferably coated on a flow-through substrate monolith, preferably a honeycomb monolith. The flow-through substrate monolith may be made of a ceramic material (e.g. cordierite) or a metallic material, e.g. Fecralloy™. The lean NOx trap is typically designed to provide a number of channels through which the exhaust gases pass. The surface of the channels is loaded with the NOx adsorbent and the oxidation/reduction catalyst(s).

The components of the lean NOx trap may be added by any known means. For example, the support material, oxidation-reduction catalyst and the NOx adsorbent material may preferably be applied and bonded to the substrate as a washcoat, a porous, high surface area layer bonded to the surface of the substrate. The washcoat is typically applied to the substrate from a water-based slurry, then dried and calcined at high temperature. The washcoat may alternatively comprise the support and NOx adsorber, and the oxidation-reduction catalyst may be loaded onto the dried washcoat support layer (by impregnation, ion-exchange, or the like), then dried and calcined.

The zoned catalysed substrate is a substrate that contains catalyst components. The substrate monolith is preferably a ceramic substrate monolith or a metallic substrate monolith, more preferably a ceramic substrate monolith. The ceramic substrate monolith may be made of any suitable refractory material, e.g. alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, which is a magnesium aluminosilicate, and silicon carbide are particularly preferred ceramic substrate monoliths.

The metallic substrate monolith may be made of any suitable metal, and in particular heat-resistant metals and metal alloys such as titanium and stainless steel as well as ferritic alloys containing iron, nickel, chromium, and/or aluminium in addition to other trace metals.

The substrate monolith is preferably a filter substrate or a flow-through substrate monolith.

If the substrate is a flow-through substrate monolith then the flow-through substrate monolith is a flow-through substrate monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

Furthermore, if the catalysed substrate monolith is a flow-through substrate monolith, the exhaust system of the invention preferably includes a particulate filter, more preferably a catalysed soot filter. Where present, the particulate filter is preferably capable of collecting soot without causing excessive back-pressure in the exhaust system. In general, ceramic, sintered metal or woven or non-woven wire filters are usable, and wall-flow honeycomb structures are particularly preferred. The structural material of the particulate filter is preferably a porous ceramic, silicon carbide, or sintered metal. The particulate filter can be catalysed, typically with a platinum group metal catalyst. The soot is generally carbon containing soluble organic fractions and/or volatile organic fractions and/or heavy hydrocarbons. Combustion of the soot produces $CO_2$ and $H_2O$.

If utilised, the particulate filter may be located upstream or downstream of the zoned catalysed substrate. Preferably, the particulate filter is upstream of the catalysed substrate and downstream of the lean NOx trap such that the exhaust gas from the internal combustion engine passes through the lean NOx trap, then the particulate filter, followed by the catalysed substrate before passing to atmosphere.

If the substrate monolith is a filter substrate, it is preferably a wall-flow monolith filter. The wall-flow monolith filter comprises an inlet end, an outlet end, a substrate axial length extending between the inlet end and the outlet end, and a plurality of channels defined by internal walls of the wall flow substrate. The plurality of channels comprise inlet channels having an open inlet end and a closed outlet end and outlet channels having a closed inlet end and open outlet end.

Hence the channels of the wall-flow filter are alternately blocked, which allow the exhaust gas stream to enter a channel from the inlet end, then flow through the channel walls, and exit the filter from a different channel leading to the outlet end. Particulates in the exhaust gas stream are thus trapped in the filter.

The substrate monolith comprises at least two catalytic zones, each zone containing a different catalyst composition deposited on the substrate monolith. In one embodiment there is substantially no overlap of the two zones on the substrate. For instance, the first zone may cover from 10 to 90 percent of the total length of the substrate and the second zone would cover the rest of the length of the substrate (i.e. the remaining 90 to 10 percent which is not covered by the first zone). Preferably, the first zone covers from 20 to 80 percent of the total length of the substrate and the second zone covers from 80 to 20 percent of the total length of the substrate. More preferably the first zone covers from 40 to 60 percent of the total length of the substrate and the second zone covers from 60 to 40 percent of the total length of the substrate.

In an alternative embodiment there may be some overlap of the two zones on the substrate. For example there could be an overlap of up to 20% or greater.

When the substrate is a filter substrate it is preferably a wall-flaw monolith filter. When such a wall-flow monolith filter is utilized, one zone may be deposited in/on the internal walls of the inlet channels and the other zone may be deposited in/on the internal walls of the outlet channels, thus effectively separating the first and second zones.

The first zone comprises a first base metal oxide or a first base metal loaded on an inorganic oxide. The first base metal is preferably selected from the group consisting of iron, manganese, copper, zinc, nickel, or mixtures thereof. The inorganic oxide is preferably selected from the group consisting of alumina, silica, titania, zirconia, ceria, niobia, tantalum oxides, molybdenum oxides, tungsten oxides, any mixed oxide or composite oxide thereof, and mixtures thereof. Alumina is particularly preferred. The first base metal oxide is preferably selected from the group consisting of iron oxide, manganese oxide, copper oxide, nickel oxide, or mixtures thereof.

The first zone may further comprise a platinum group metal loaded on a support. The platinum group metal is preferably platinum, palladium, rhodium, or mixtures thereof; most preferably, the platinum group metal is platinum, palladium, and mixtures thereof. The support is preferably a zeolite, an inorganic oxide, or mixtures thereof. More preferably, the support is an inorganic oxide such as alumina, silica, titania, zirconia, ceria, niobia, tantalum oxides, molybdenum oxides, tungsten oxides, mixed oxides or composite oxides of any two or more thereof (e.g. silica-alumina, ceria-zirconia or alumina-ceria-zirconia), and mixtures thereof. Alumina and ceria-zirconia mixed oxide are particularly preferred.

When the first zone additionally comprises the platinum group metal loaded on a support it is preferred that the first base metal oxide or first base metal loaded on an inorganic oxide is physically separated from the platinum group metal loaded on a support. This is because the first base metal oxide may poison the hydrocarbon and carbon monoxide oxidising capability of the platinum group metal catalyst. Thus, separate particles of the supported platinum group metal and the first base metal oxide or first base metal loaded on an inorganic oxide are added to the first zone in order to physically segregate the two catalysts within the first zone.

The second zone comprises a second base metal oxide or a second base metal loaded on an inorganic oxide. The second base metal is preferably iron, manganese, copper, nickel, or mixtures thereof. The inorganic oxide is preferably alumina, silica, titania, zirconia, ceria, niobia, tantalum oxides, molybdenum oxides, tungsten oxides, any mixed oxide or composite oxide thereof, and mixtures thereof. Alumina is particularly preferred. The second base metal oxide is preferably iron oxide, manganese oxide, copper oxide, zinc oxide, nickel oxide, or mixtures thereof. The second base metal is chosen such that it is different from the first base metal.

The second zone may further comprise a platinum group metal loaded on a support. The platinum group metal is preferably platinum, palladium, rhodium, or mixtures thereof; most preferably, the platinum group metal is platinum, palladium, and mixtures thereof. The support is preferably a zeolite, an inorganic oxide, or mixtures thereof. More preferably, the support is an inorganic oxide such as alumina, silica, titania, zirconia, ceria, niobia, tantalum oxides, molybdenum oxides, tungsten oxides, mixed oxides or composite oxides of any two or more thereof (e.g. silica-alumina, ceria-zirconia or alumina-ceria-zirconia), and mixtures thereof. Alumina and ceria-zirconia mixed oxide are particularly preferred.

When the second zone additionally comprises the platinum group metal loaded on a support it is preferred that the base metal oxide or base metal loaded on an inorganic oxide is physically separated from the platinum group metal.

The catalysed substrate monolith of the present invention may be prepared by processes well known in the prior art. Methods of zone coating are disclosed in, for example, WO 99/47260. Preferably, the catalytic zones are deposited on the substrate using washcoat procedures. A representative process for preparing the catalysed substrate monolith using a washcoat procedure is set forth below. It will be understood that the process below can be varied according to different embodiments of the invention. Also, the order of addition of the first zone and the second zone onto the substrate is not considered critical. Thus, the first zone can be washcoated on the substrate prior to washcoating the second zone or the second zone can be washcoated on the substrate prior to washcoating the first zone.

The first zone of the catalysed substrate monolith is preferably prepared using a washcoat procedure. If a base metal/inorganic oxide is utilised, the base metal is preferably loaded onto the inorganic oxide by, for example, supporting a base metal compound such as iron acetate on the inorganic oxide by impregnation, adsorption, ion-exchange, incipient wetness, precipitation, or the like prior to washcoating the first zone. Firstly the base metal compounds supported on the inorganic oxide are preferably milled or subject to another comminution process in order to ensure that substantially all of the solid particles have a particle size of less than 20 microns in an average diameter. Then the washcoating is preferably performed by slurrying these finely divided particles of the base metal compound supported on the inorganic oxide in an appropriate solvent, preferably water, to form the slurry. The slurry preferably contains between 4 to 40 weight percent solids, more preferably between 6 to 30 weight percent. Additional components, such as stabilizers or promoters may also be incorporated in the slurry as a mixture of water soluble or water-dispersible compounds or complexes. The substrate may then be coated one or more times with the slurry such that there will be deposited on the substrate the desired loading of catalytic materials.

If a base metal oxide is utilised then this can be applied to the substrate using similar washcoat preparation techniques described above. Additional binders may be used in the washcoat slurry to help adhesion of the base metal oxide to the substrate. When the first zone additionally comprises the supported platinum group metal, then the supported platinum group metal and the base metal oxide (or base metal/inorganic oxide) are preferably loaded onto the substrate such that the two catalysts are physically separated within the first zone. This may be accomplished by any known means, for example the base metal oxide (or base metal/inorganic oxide) is added to the first zone as a separate washcoat step from the addition of the platinum group metal.

For the washcoat step for the addition of the supported platinum group metal, the platinum group metal may be added to the support prior to the washcoating step or may be added to a support-coated substrate after washcoating the support onto the substrate. If the platinum group metal is added to the support prior to washcoating the first zone of the substrate, it can be loaded onto the support by any known means, the manner of addition is not considered to be particularly critical. For example, a platinum compound (such as platinum nitrate) may be supported on the support by impregnation, adsorption, ion-exchange, incipient wetness, precipitation, or the like. Firstly the support or the platinum group metal/support particles are milled or subject to another comminution process in order to ensure that substantially all of the solid particles have a particle size of less than 20 microns in an average diameter, prior to forming the slurry. The washcoating is preferably performed by first slurrying the finely divided particles of the supported platinum group metal (or just the support) in an appropriate solvent, preferably water, to form the slurry. The slurry preferably contains between 4 to 40 weight percent solids, more preferably between 6 to 30 weight percent. Preferably, additional components, such as stabilizers or promoters may also be incorporated in the slurry as a mixture of water soluble or water-dispersible compounds or complexes.

The substrate may then be coated one or more times with the slurry such that there will be deposited on the substrate monolith the desired loading of catalytic materials. If only the support is deposited on the substrate monolith, the platinum group metal may then be added to the support-coated substrate monolith by any known means, including impregnation, adsorption, or ion-exchange of a platinum compound (such as platinum nitrate).

Preferably, the substrate monolith is coated so that the first zone only occupies from 10 to 90 percent of the axial length of the substrate, more preferably from 20 to 80 percent, especially from 40 to 60 percent of the axial length the substrate.

After the first zone of the substrate monolith has been coated the coated substrate is typically dried by heating at an elevated temperature of preferably 80 to 150° C. The substrate may also be calcined at higher temperatures (such as 400 to 600° C.) but calcination is typically not required before the addition of the second zone.

Alternatively, the platinum group metal and the base metal may be added simultaneously by washcoating a slurry that contains distinct particles of the base metal oxide (or base metal/inorganic oxide) and the supported platinum group metal.

The second zone of the catalysed substrate monolith is preferably prepared using a washcoat procedure in the same manner as for the first zone. In one embodiment the substrate monolith is coated with the second zone washcoat so that the second zone and the first zone have substantially no overlap. For such an embodiment the second zone will preferably only occupy from 10 to 90 percent of the axial length of the substrate, more preferably from 20 to 80, especially from 40 to 60 percent of the axial length of the substrate monolith. In an alternative embodiment the substrate is coated with the second zone washcoat so that there is overlap of the two zones of up to 20% or greater.

After the substrate monolith has been coated with the second washcoat, the coated substrate is typically dried and then calcined by heating at an elevated temperature. Preferably, the calcination occurs at 400 to 600° C. for approximately 1 to 8 hours.

In certain instances, it may be preferable to add a small third zone to the substrate such that the third zone (preferably occupying less than 20 percent, and more preferably less than 10 percent, of the axial length of the substrate) is located after the second zone and at the opposite end of the substrate from the first zone. A third zone may be particularly useful when the substrate monolith is a filter substrate and the first zone is positioned in the exhaust system to contact the exhaust gas prior to the second zone, such that hydrocarbons and CO formed during burning of soot at high temperature may not be totally combusted over the second zone. If used, the third zone will contain supported platinum group metals, preferably platinum, palladium, and/or rhodium, to aid in the oxidation of any hydrocarbons and CO.

The zoned catalysed substrate is preferably located in the exhaust system such that it is downstream of the lean NOx trap, so that the exhaust gas contacts the lean NOx trap prior to contacting the catalysed substrate. Preferably, the two-zone catalysed substrate is positioned in the exhaust system such that there is an upstream (entrance) zone which is contacted by the exhaust gas after exiting the lean NOx trap and a downstream (exit) zone following the upstream zone. The upstream zone that contacts the exhaust gas from the lean NOx trap may be either the first zone or the second zone of the catalysed substrate. Thus, the first zone can be oriented to receive exhaust gas from the NOx trap prior to the second zone; or the second zone can be oriented to receive exhaust gas from the NOx trap prior to the first zone.

The catalysed substrate monolith removes/controls the $H_2S$ released from the NOx trap desulphation by forming sulphide compounds in rich gas mixtures and oxidising sulphides to $SO_2$ or $SO_3$ in lean gas mixtures. When present, the supported platinum group metal catalyst oxidises hydrocarbons and carbon monoxide that are not converted prior to contacting the catalysed substrate. When the catalysed substrate monolith is a filter substrate, it also removes soot from the exhaust gas.

The exhaust system may further comprise an oxidation catalyst positioned between the internal combustion engine and the lean NOx trap to oxidise hydrocarbons and carbon monoxide in the exhaust gas. Such oxidation catalysts are well known in the prior art for both diesel and gasoline engines.

The internal combustion engine is preferably a lean burn internal combustion engine.

"Lean-burn" refers to the use of lean mixtures in both a gasoline and diesel (compression-ignition) fuel powered internal combustion engine. The engine fuel can also include at least some biodiesel, bioethanol, components derived from a gas-to-liquid process, liquid petroleum gas or natural gas. The engine may be used in a mobile application, such as a vehicle, or a stationary application, such as a power generation unit. Preferably use of the lean mixtures is in a diesel internal combustion engine, more preferably a diesel internal combustion engine in a mobile application, especially in a vehicle. Vehicles include both light duty and heavy duty diesel, for example cars, trains and boats, with a preference for light duty vehicles, more preferably passenger cars (as opposed to heavy duty vehicle applications, such as trucks and buses).

Accordingly, in a third aspect, the invention provides a method of treating an exhaust gas from an internal combustion engine, in particular for treating exhaust gas from a vehicular lean burn internal combustion engine, such as a diesel engine, a lean-burn gasoline engine, or an engine powered by liquid petroleum gas or natural gas, which method comprising directing the exhaust gas through an exhaust emission system according to the second aspect of the present invention.

According to a fourth aspect, the invention provides an apparatus comprising an internal combustion engine and an exhaust system according to the second aspect of the invention.

According to a fifth aspect, the invention provides a vehicle comprising the apparatus according to the fourth aspect of the present invention.

According to a sixth aspect, the invention provides a method of making a zoned catalysed substrate monolith according to the first aspect of the present invention, wherein the first and second zones are deposited on a substrate monolith using washcoating procedures, wherein the first zone is washcoated on the substrate monolith prior to the washcoating of the second zone.

The present invention will now be described with reference to the accompanying drawing in which FIG. 1 is a graph showing the hydrogen sulphide slip for a simulated rich exhaust gas passed through a catalysed substrate of the invention and a comparative catalysed substrate and with reference to the Examples described below. It should be noted that the Examples are provided by way of illustration only.

EXAMPLES

Example 1

A slurry was prepared using alumina and ceria-zirconia mixed oxide milled to a $d_{90}$ particle size of <15 micron. Appropriate amounts of soluble Pt and Pd salts were added to give a final coated catalyst loading of 20 g/ft$^3$ with a Pt:Pd weight ratio of 2:1. Beta zeolite was added to the slurry followed by manganese dioxide ($d_{90}$<10 micron) and the mixture stirred to homogenise. The coating slurry was applied to the inlet channels of a commercial wall-flow aluminium titanate filter substrate using established particulate filter coating techniques (see e.g. WO2011/080525), such that the coating was to 50% of the total length of the substrate. This coating was dried at 100° C. The inlet coated filter had a manganese loading of 125 g/ft$^3$ in the inlet coated zone.

A second slurry was prepared using alumina and ceria-zirconia mixed oxide milled to a $d_{90}$ particle size of <15 micron. Appropriate amounts of soluble Pt and Pd salts were added to give a final coated catalyst loading of 20 g/ft$^3$ with a Pt:Pd weight ratio of 2:1. Beta zeolite was added to the slurry followed by iron oxide ($d_{90}$<5 micron) and the mixture stirred to homogenise. The second coating slurry was applied to the outlet channels of the above wall flow aluminium titanate substrate using established particulate filter coating techniques, such that the coating was to 50% of the total length of the substrate. This coating was dried at 100° C. and the part calcined at 500° C. The coated filter had an iron loading of 250 g/ft$^3$ in the outlet zone.

Comparative Example 2

First Comparative Example

An identical coated filter to Example 1 was prepared, except in that the inlet zone coating contained no manganese and the outlet zone coating contained no iron, but manganese at a loading of 125 g/ft$^3$.

Second Comparative Example

An identical coated filter to Example 1 was prepared, except in that the inlet zone coating contained no manganese and the outlet zone coating contained both iron at 250 g/ft$^3$ and manganese at a loading of 125 g/ft$^3$.

Example 3

The H$_2$S controlling performance of the coated filters was determined using a laboratory reactor and a simulated exhaust gas. Lean and rich exhaust gas mixtures were used to represent those produced during the desulphation of an lean NOx trap. All samples were previously aged under hydrothermal conditions of 800° C. for 16 hours. The reactor was heated to the first evaluation temperature and a lean gas mix was passed through the sample for 20 seconds. The gas mix was then switched to a rich gas mix for 20 seconds. This cycle of alternating lean and rich gas mixes was repeated during the test. Gas mix concentrations are given in Table 1, with the balance being nitrogen.

TABLE 1

| | Lean gas mix | Rich gas mix |
| --- | --- | --- |
| CO$_2$ | 14% | 14% |
| HC | 120 ppm (C$_1$) | 2000 ppm (C$_1$) |
| O$_2$ | 1.7% | 0 |
| H$_2$O | 5% | 5% |
| H$_2$ | 0 | 0.07% |
| CO | 0 | 0.24% |
| H$_2$S | 0 | 500 ppm |

The concentration of H$_2$S downstream of the filter sample was continuously measured and the peak concentration of H$_2$S determined. This value is termed H$_2$S slip. The average H$_2$S slip measured over 5 cycles of lean/rich operation is shown in FIG. 1.

FIG. 1 illustrates the H$_2$S slip for a simulated rich exhaust gas passed through a catalysed substrate monolith of the invention (according to Example 1) and exhaust gas passed through Comparative catalysed substrates (according to Example 2). FIG. 1 clearly shows that the zoned catalysed substrate of the invention controls hydrogen sulphide emissions more effectively than a single base metal oxide or a mixture of base metal oxides in a single zone.

For the avoidance of any doubt, the entire contents of any and all prior art documents cited herein are incorporated herein by reference.

The invention claimed is:

1. A zoned catalysed substrate monolith comprising a first zone and a second zone, wherein the first zone and the second zone are arranged axially in series,
wherein the first zone comprises a platinum group metal loaded on a support and a first base metal oxide selected from the group consisting of iron oxide, manganese oxide, copper oxide, zinc oxide, nickel oxide, and mixtures thereof or a first base metal selected from the group consisting of iron, manganese, copper, zinc, nickel, and mixtures thereof loaded on an inorganic oxide and
the second zone comprises a second base metal oxide selected from the group consisting of iron oxide, manganese oxide, copper oxide, zinc oxide, nickel oxide, and mixtures thereof or a second base metal selected from the group consisting of iron, manganese, copper, zinc, nickel, and mixtures thereof loaded on an inorganic oxide,
wherein the second base metal is different from the first base metal, and the second zone does not contain copper or iron loaded on a zeolite.

2. A zoned catalysed substrate monolith according to claim 1, wherein the platinum group metal in the first zone is selected from the group consisting of palladium, platinum, rhodium, and mixtures thereof, and the support is selected from the group consisting of inorganic oxides, zeolites, and mixtures thereof.

3. A zoned catalysed substrate monolith according to claim 1, wherein the first base metal oxide or the first base metal loaded on an inorganic oxide in the first zone is physically segregated from the platinum group metal loaded on the support.

4. A zoned catalysed substrate monolith according to claim 1, wherein the first zone comprises a lean $NO_x$ trap composition, wherein the platinum group metal loaded on a support is a component of the lean $NO_x$ trap composition.

5. A zoned catalysed substrate monolith according to claim 1, wherein in the first zone or the second zone the inorganic oxide is selected from the group consisting of alumina, silica, titania, zirconia, ceria, niobia, tantalum oxides, molybdenum oxides, tungsten oxides, any mixed oxide or composite oxide thereof, and mixtures thereof.

6. A zoned catalysed substrate monolith according to claim 1, wherein the substrate monolith is a filter substrate or a flow-through substrate monolith.

7. A zoned catalysed substrate monolith according to claim 1, wherein the substrate monolith is a filter substrate which is a wall-flow monolith filter comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end and outlet channels having a closed inlet end and open outlet end.

8. A zoned catalysed substrate monolith according to claim 7, wherein the first zone is deposited in or on the inlet channels of the inlet end of the wall-flow monolith filter and the second zone is deposited in or on the outlet channels of the outlet end of the wall-flow monolith filter.

9. A zoned catalysed substrate monolith according to claim 1, wherein there is substantially no overlap between the first and second zones.

10. A zoned catalysed substrate monolith according to claim 9, wherein the first zone covers from 10 to 90 percent of the total axial length of the substrate monolith and the second zone covers from 90 to 10 percent of the total axial length of the substrate.

11. A zoned catalysed substrate monolith according to claim 1, wherein there is overlap between the first and second zones.

12. A zoned catalysed substrate monolith according to claim 11, wherein each of the first zone and the second zone covers from 10 to 90 percent of the total axial length of the substrate monolith.

13. A zoned catalysed substrate monolith according to claim 1 comprising a third zone located axially in series after the second zone and at the opposite end of the substrate from the first zone, wherein the third zone comprises a supported platinum group metal, wherein the third zone does not contain copper or iron loaded on a zeolite.

14. A zoned catalysed substrate monolith according to claim 1, wherein neither the first zone nor the second zone contains copper or iron loaded on a zeolite.

15. An exhaust system for an internal combustion engine comprising:
(a) a lean $NO_x$ trap; and
(b) a zoned catalysed substrate monolith of claim 1,
wherein the zoned catalysed substrate monolith is disposed downstream from the lean $NO_x$ trap.

16. An exhaust system according to claim 15, wherein the first zone is oriented to the upstream side.

17. An exhaust system according to claim 15, wherein the substrate monolith of the zoned catalysed substrate monolith is a flow-through substrate monolith and the exhaust emissions system further comprises a particulate filter.

18. An exhaust system according to claim 15, further comprising an oxidation catalyst disposed upstream of the lean $NO_x$ trap.

19. An apparatus comprising an internal combustion engine and an exhaust system according to claim 15.

20. A vehicle comprising the apparatus of claim 19.

21. A method of treating an exhaust gas from an internal combustion engine, which method comprising directing the exhaust gas through an exhaust emission system according to claim 15.

22. A method of making a zoned catalysed substrate monolith according to claim 1, wherein the first and second zones are deposited on a substrate monolith using washcoating procedures, wherein the first zone is washcoated on the substrate monolith prior to the washcoating of the second zone.

* * * * *